(12) United States Patent
Chiummiento et al.

(10) Patent No.: US 10,340,978 B2
(45) Date of Patent: Jul. 2, 2019

(54) DETERMINATION OF INSTANTANEOUS IMPEDANCE OF AN AC POWER LINE USED AS A TRANSMISSION LINE

(71) Applicant: Itron Global SARL, Liberty Lake, WA (US)

(72) Inventors: Philippe Chiummiento, Fontenay-aux-Roses (FR); Matthieu Pichot, Issy-les-Moulineaux (FR); Dinh Thang Vu, Issy-les-Moulineaux (FR)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 15/754,267

(22) PCT Filed: Aug. 19, 2016

(86) PCT No.: PCT/EP2016/069751
§ 371 (c)(1),
(2) Date: Feb. 21, 2018

(87) PCT Pub. No.: WO2017/032724
PCT Pub. Date: Mar. 2, 2017

(65) Prior Publication Data
US 2018/0287662 A1 Oct. 4, 2018

(30) Foreign Application Priority Data

Aug. 21, 2015 (EP) ..................................... 15306305

(51) Int. Cl.
*H04B 3/54* (2006.01)
*H04B 3/46* (2015.01)

(52) U.S. Cl.
CPC ................. *H04B 3/54* (2013.01); *H04B 3/46* (2013.01)

(58) Field of Classification Search
CPC ................................... H04B 3/54; H04B 3/46
See application file for complete search history.

(56) References Cited

U.S. PATENT DOCUMENTS 7,521,943 B2    4/2009   Binder et al.
7,919,970 B2    4/2011   Hazani et al.
(Continued)

*Primary Examiner* — Freshteh N Aghdam
(74) *Attorney, Agent, or Firm* — Lee & Hayes, P.C.

(57) ABSTRACT

There is provided a method and apparatus for determining the input impedance ($Z_L$) of an AC transmission line used for Power Line Communications (PLC), using a transmitted data packet having a preamble portion. The method comprises, at the analog-front-end (AFE) of the AC transmission line, determining the current through the AFE and the AC transmission line during transmission of the preamble portion of the data packet and determining the voltage during transmission of the preamble portion of the data packet. The method further comprises calculating the total impedance ($Z_t$) from the determined current and voltage. The total impedance ($Z_t$) includes the input impedance ($Z_L$) of the AC transmission line and the AFE impedance ($Z_{AFE}$). Finally, the method includes determining the input impedance ($Z_L$) of the AC transmission line from the total impedance ($Z_t$).

15 Claims, 1 Drawing Sheet

(56) References Cited

U.S. PATENT DOCUMENTS

| | | | | |
|---|---|---|---|---|
| 9,793,873 | B2* | 10/2017 | Zhu .......................... | H03H 7/40 |
| 2008/0048676 | A1* | 2/2008 | De Villiers .............. | H04B 3/54 |
| | | | | 324/629 |
| 2012/0181861 | A1* | 7/2012 | Brockmann .......... | H02M 5/293 |
| | | | | 307/11 |
| 2012/0187905 | A1* | 7/2012 | Kanayama ............... | H04B 3/54 |
| | | | | 320/109 |
| 2014/0233620 | A1* | 8/2014 | Bernheim ................ | H04B 3/54 |
| | | | | 375/224 |
| 2014/0247892 | A1* | 9/2014 | Williams ................ | H04B 3/54 |
| | | | | 375/257 |
| 2014/0307812 | A1* | 10/2014 | Chen ........................ | H04B 3/54 |
| | | | | 375/258 |

* cited by examiner

DETERMINATION OF INSTANTANEOUS IMPEDANCE OF AN AC POWER LINE USED AS A TRANSMISSION LINE

RELATED APPLICATIONS

This application is a National Stage Application of PCT Patent Application No. PCT/EP2016/069751, filed Aug. 19, 2016, titled "Determination of Instantaneous Impedance of an AC Power Line used as a Transmission Line," which claims priority to International Patent Application No. EP15306305.2, filed Aug. 21, 2015, titled "Determination of Instantaneous Impedance of an AC Power Line used as a Transmission Line," both of which are commonly assigned herewith, and hereby incorporated by reference.

FIELD OF THE INVENTION

The present invention relates to a method and apparatus for determining the input impedance of an AC power line used as a transmission line.

BACKGROUND OF THE INVENTION

Wired communication network topologies generally employ one or more communication links, each link connecting two nodes via a cable or wires. Power Line Communication (PLC) carries data on a communication link which is also used for AC electrical power transmission. For example, PLC may be used in the home to connect home computers using the existing electrical wiring. A signal is coupled to the cable via a transmitter power amplifier associated with a passive coupler and is propagated over the transmission line. The signal is absorbed at a termination point and received at a receiver at the downstream end of the transmission line. The transmission line may be any line which includes two or more conductors and may be used to carry electrical signals, including but not limited to a coaxial cable or a twisted pair.

Knowledge of the input impedance of the transmission line as it varies with time and frequency is useful for regulation of the power supply to the transmitter power amplifier, dynamic adaptation of the power line coupler and fault response indication.

According to U.S. Pat. No. 7,521,943 B1 and continuation U.S. Pat. No. 7,919,970 B2, the characteristic impedance of a transmission line may be determined by transmitting an electrical signal along the line and, shortly afterwards, measuring the voltage and current and hence determining the impedance. Electrical signals may be transmitted periodically, when an external electrical signal is received, after power up, or at any other chosen time. For transmission of the electrical signal, and hence calculation of the impedance, a Characteristic Impedance Meter (CIM) is connected to the transmission line. Once the characteristic impedance has been determined, the CIM is disconnected from the transmission line and the transmission line is reconnected to a normal state of communication operation.

It is an object of the invention to provide an improved method and apparatus for determining the input impedance of a transmission line used for Power Line Communication.

SUMMARY OF THE INVENTION

The emerging Narrow Band PLC Standards (less than 500 kHz) for smart grid applications (IEEE P1901.2, ITU9902, ITU9903-G3 PLC, ITU9904-PRIME) use Orthogonal Frequency Division Multiplexing (OFDM) in combination with coded Differential Phase Shift Keying (DPSK), which is known as a simple and robust technique for data transmission along the line. In OFDM, the bit stream that is to be transmitted is split into several parallel bit streams, typically hundreds or thousands. The available frequency spectrum is split into several channels and each low bit rate stream is transmitted over one channel using, in this case, a DPSK modulation scheme. The IEEE P1901.2 scheme uses Differential Binary PSK (DBPSK), Differential Quadrature PSK (DQPSK) or, in some arrangements, Differential Eight-ary (D8PSK) modulation for differential encoding in time, whereas the ITU9902 scheme uses DBPSK, DQPSK or D8PSK modulation for differential encoding in frequency.

IEEE P1901.2, ITU9903-G3 PLC, and ITU9904-PRIME specify different modes of operation depending on the region regulations. Three main modes of operation are defined in the standards: CENELEC Bands (A, B, C, D) from 9 kHz to 150 kHz, FCC Band from 150 kHz to 490 kHz, and ARIB Band from 150 kHz to 450 kHz. For each mode of operation, a specific sampling frequency, number of subcarriers and subcarrier spacing are specified, resulting in different OFDM symbol length and duration.

For example the CENELEC A mode of operation for IEEE P1901.2 and ITU9903-G3 PLC uses a sampling frequency of 400 kHz and uses an FFT (Fast Fourier Transform) size of 256, leading to a subcarrier spacing of $\Delta f=1.65625$ kHz. Thus by modulating carrier numbers 23 to 58 only, G3 PLC occupies the frequency range 35.9-90.6 kHz. For the CENELEC A band mode of operation for ITU9904-PRIME, the sampling frequency is 250 kHz, while the FFT size is 512, so the subcarrier spacing accounts for $\Delta f=488$ Hz. Since carriers 86 to 182 only are used for transmission, the PRIME signal is located in the frequency range 42-89 kHz.

Narrow Band PLC standards use pre-defined signal patterns known by the transmitter and receiver for the preamble at the start of each data packet. The preamble serves several purposes: synchronisation for OFDM symbol FFT processing, Automatic Gain Control setting and detection of data packet start. The preamble pattern definition also depends on the region regulations: for each band a specific preamble format is specified. For IEEE P1901.2 and ITU9903-G3 PLC in CENELEC A Band, 9 and ½ OFDM symbols are used corresponding to 9 and ½ chirp signals, each chirp OFDM symbol sweeping the whole transmitter or receiver bands from 35.9 kHz to 90.6 kHz. The preamble length is 6792 μs whereas for FCC bands the preamble length is 2264 μs. For ITU9904-PRIME, the preamble is based on a linear chirp signal of 2048 μs length sweeping across the transmitter or receiver bandwidth from 42 kHz to 89 kHz.

The method and apparatus of the invention make use of the preamble portion of each data packet to determine the instantaneous input impedance of the transmission line. Although the invention will be described with reference to the current IEEE P1901.2 and ITU9903-G3 PLC proposals, the invention is equally applicable to any PLC communications using data packets including a preamble signal sweeping the whole system bandwidth (i.e., chirp) at the start of each transmitted data packet.

More specifically, according to a first aspect of the invention, there is provided a method for determining the input impedance ($Z_L$) of an AC transmission line used for Power Line Communications (PLC), using a transmitted data packet having a preamble portion, the method comprising the steps of: at the analog-front-end (AFE) of the AC transmission line, determining the current through the AFE and the AC transmission line during transmission of the preamble portion of the data packet; at the AFE of the AC transmission line, determining the voltage during transmission of the preamble portion of the data packet; from the determined current and voltage, calculating the total impedance (Zt), the total impedance (Zt) including the input impedance (ZL) of the AC transmission line and the AFE impedance (ZAFE); and determining the input impedance (ZL) of the AC transmission line from the total impedance (Zt).

The method allows instantaneous determinations of the transmission line input impedance value ZL (real and imaginary parts) in both the time and frequency domains. This is because the impedance is determined using at least part of the preamble portion of each (preferably every) packet transmitted along the line. There is no need to transmit a separate electrical signal along the transmission line, in order to determine the impedance, for example as in some prior art arrangements. Such an injected signal is intrusive and may cause interference and degrade performance. In addition, the method may be performed on an existing analog-front-end (AFE) of a PLC transmitter, rather than requiring a separate input connection, for example a CIM, as in prior art arrangements. Thus, a suitable algorithm for performance of the method of the invention may be incorporated into software for programming the AFE.

Throughout this specification, the term "transmission line" includes any suitable line for transmission of an Alternating Current (AC) signal and data. Transmission lines include metallic transmission lines such as coaxial cables or twisted pairs. Transmission lines may be incorporated into networks, which may be point-to-point or multi-point networks.

The AFE is coupled to the AC transmission line and may be arranged, in conjunction with a controller, to convert the outgoing signal to an analog signal, amplify the signal and transmit the signal along the AC transmission line. The AFE may also be arranged to receive an incoming analog signal and convert the incoming signal to a digital signal. Preferably, therefore, the AFE (or the AFE in combination with the controller) comprises an Analog-to-Digital Convert (ADC) and a Power Gain Amplifier in the Receive portion, and a Digital-to-Analog Converter (DAC) and a Power Amplifier in the Transmit portion.

In one embodiment, the step of determining the current during transmission of the preamble portion of the data packet comprises determining the current using a current sensor in the AFE. In that embodiment, preferably, the AFE includes a power amplifier for amplifying the data packet to be transmitted, and the current sensor is in series with the output of the power amplifier.

The current sensor may be, for example, a resistor, capacitor or inductor. The current sensor is in series with the output of the power amplifier in the AFE. Preferably, the current is determined by measuring the voltage at the output of the power amplifier, measuring the voltage at the output of the current sensor, determining the difference between the two voltages, and calculating the current using the difference between the two voltages and the impedance (ZREF) of the current sensor.

Preferably, the AFE includes a power amplifier and the step of determining the voltage comprises determining the voltage at the output of the power amplifier.

Thus, in one embodiment, determination of both the current and the voltage during transmission of the preamble portion of the data packet requires determination of the voltage at the output of a power amplifier in the AFE and determination of the voltage at the output of a current sensor in series with the output of the power amplifier in the AFE.

In a preferred embodiment, the steps of determining the current and determining the voltage during transmission of the preamble portion of the data packet together comprise sampling two voltages during transmission of the preamble portion of the data packet. The two voltages may be sampled using two respective channels of an Analog-to-Digital Convertor (ADC) in the AFE. Alternatively, it may be advantageous to use channels in two separate ADCs for sampling the two voltages, so that the two voltages can be sampled simultaneously, rather than sequentially. This avoids any time delay between sampling and has been shown to give a more accurate result than sequential sampling.

Preferably, the two sampled voltages are stored so that they can be used later for determining the input impedance of the AC transmission line. The two sampled voltages may be stored in registers in the ADC. Subsequently or alternatively, the two sampled voltages may be stored in a separate memory, which may reside in the AFE or in an associated controller.

Preferably, the steps of determining the current and determining the voltage are synchronised with transmission of the preamble portion of the data packet using one or more input signals of an Analog-to-Digital Converter (ADC) in the AFE. Preferably, an Interrupt signal of the ADC, for example from a central processor, is used to trigger the determination of the current and the voltage.

Once the necessary data has been sampled, the data may be transferred from a register in the ADC to a separate memory using a routine in the ADC or using Direct Memory Access.

The step of calculating the total impedance (Zt) from the determined current and voltage may comprise: a) transforming determined voltages to complex form; and b) calculating the total impedance (Zt) using the complex voltages (V1, V2) and the known current sensor impedance (ZREF). Preferably, this is performed according to:

$$Z_t = \frac{V_2 Z_{ref}}{V_2 - V_1}.$$

Preferably, step a) of transforming the determined voltages to complex form is performed using a Fast Fourier Transform (FFT). The two FFT transformations may be performed in series or in parallel. Preferably, the FFT matrix values are stored in one or more LookUp Tables (LUTs).

The step of determining the input impedance (ZL) of the AC transmission line from the total impedance (Zt) preferably comprises de-embedding the AFE impedance (ZAFE) from the total impedance (Zt). The AFE impedance (ZAFE) includes the impedances of a number of AFE components and can be characterized by measuring the scattering parameter of the AFE as a 2 port network. De-embedding the AFE impedance (ZAFE) from the total impedance (Zt) preferably comprises removing the effect of the AFE impedance, in order to obtain an accurate result for the input impedance (ZL) of the AC transmission line.

For example, if the total impedance is represented by Zt, the input impedance of the AC transmission line is represented by ZL, the scattering parameters of the AFE are represented by Sxx, and we define:

$$\Gamma = \frac{Z_t - 50}{Z_t + 50},$$

-continued
and:

$$\Gamma_L = \frac{\Gamma - S_{11}}{S_{22}*(\Gamma - S_{11}) + S_{12}*S_{21}},$$

we then have:

$$Z_L = 50 * \frac{1+\Gamma_L}{1-\Gamma_L}$$

In a preferred embodiment, the current and voltage are determined during transmission of a part of the preamble portion, such that the step of calculating and the step of determining can be performed before the next data packet is to be transmitted along the AC transmission line.

According to the first aspect of the invention, there is also provided a method for determining the input impedance (ZL) of an AC transmission line used for narrow band Power Line Communications (PLC), using a transmitted data packet having a preamble portion, the method comprising the steps of: a) determining the voltage (V1) at the output of a power amplifier in the analog-front-end (AFE) of the AC transmission line, during transmission of the preamble portion of the data packet; b) determining the voltage (V2) at the output of a passive component at the output of the power amplifier in the AFE of the AC transmission line, during transmission of the preamble portion of the data packet; c) using the difference between the voltages (V1, V2) determined at a) and b), and the impedance (ZREF) of the passive component, to determine the current during transmission of the preamble portion of the data packet; d) storing the voltage (V1) determined at a) and the current determined at c) in memory; e) calculating the total impedance (Zt) from the stored voltage (V1) determined at a) and the stored current determined at c), the total impedance (Zt) including the input impedance (ZL) of the AC transmission line and the AFE impedance (ZAFE); and f) determining the input impedance (ZL) of the AC transmission line from the total impedance (Zt).

The method of the first aspect of the invention may be repeated for every data packet transmitted (or a proportion of the data packets transmitted). This allows a determination of the input impedance of the AC transmission line with time and frequency of the transmitted signal.

According to a second aspect of the invention, there is provided apparatus for determining the input impedance (ZL) of an AC transmission line used for Power Line Communications (PLC), using a transmitted data packet having a preamble portion, the apparatus comprising: a current sensor in the analog-front-end (AFE) of the AC transmission line for determining the current through the AFE and the AC transmission line during transmission of the preamble portion of the data packet; a voltage sensor in the AFE of the AC transmission line for determining the voltage during transmission of the preamble portion of the data packet; means for calculating, from the determined current and voltage, the total impedance (Zt), the total impedance (Zt) including the input impedance (ZL) of the AC transmission line and the AFE impedance (ZAFE); and means for determining the input impedance (ZL) of the AC transmission line from the total impedance (Zt).

The AFE may further include a power amplifier for amplifying the data packet to be transmitted and the current sensor is preferably in series with the output of the power amplifier. The determined current during transmission of the preamble portion of the data packet and the determined voltage during transmission of the preamble portion of the data packet may be together obtained by sampling two voltages during transmission of the preamble portion of the data packet, the two voltages preferably being sampled using two respective channels of an Analog-to-Digital Convertor (ADC) in the AFE.

Preferably, the steps of determining the current and determining the voltage are synchronised with transmission of the preamble portion of the data packet using one or more input signals of an Analog-to-Digital Converter (ADC) in the AFE.

Preferably, the means for calculating, from the determined current and voltage, the total impedance (Zt) is arranged to a) transform the determined voltages to complex form; and b) calculate the total impedance (Zt) using the complex voltages (V1, V2) and the known current sensor impedance (ZREF). Preferably, this is performed according to:

$$Z_t = \frac{V_2 Z_{ref}}{V_2 - V_1}.$$

Preferably, step a) of transforming the determined voltages to complex form is performed using a Fast Fourier Transform (FFT). The two FFT transformations may be performed in series or in parallel. Preferably, the FFT matrix values are stored in one or more LookUp Tables (LUTs).

Determining the input impedance (ZL) of the AC transmission line from the total impedance (Zt) preferably comprises de-embedding the AFE impedance (ZAFE) from the total impedance (Zt).

In a preferred embodiment, the current and voltage are determined during transmission of a part of the preamble portion, such that the means for calculating and the means for determining can perform the calculating and determining before the next data packet is to be transmitted along the AC transmission line.

Features described in relation to one aspect of the invention may also be applicable to another aspect of the invention.

BRIEF DESCRIPTION OF THE DRAWINGS

The invention will now be further described, by way of example only, with reference to accompanying drawings, of which.

DETAILED DESCRIPTION

An embodiment of the invention will now be described with reference to the ITU9903-G3 PLC scheme for implementation of the IEEE Standard for low frequency (less than 500 kHz) narrow band Power Line Communications for smart grid applications (IEEE P1901.2). However, it will be appreciated by the person skilled in the art that the invention is equally applicable to the PRIME scheme or indeed any other scheme for narrow band PLC communications using data packets including a preamble (chirp) signal at the start of each transmitted data packet.

Figure 1:
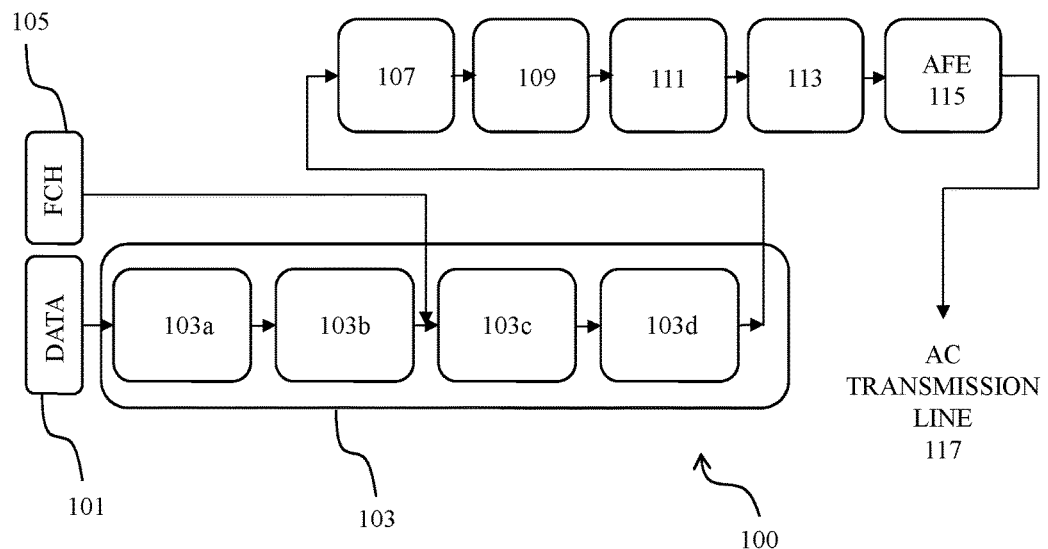
FIG. 1 is a schematic block diagram of a PLC G3 transmitter according to the prior art.

FIG. 1 is a schematic block diagram of a PLC G3 transmitter 100 according to the prior art. Transmitter 100 comprises a Forward Error Correction Encoder 103 which receives the data 101 to be transmitted. Data 101 is first scrambled in Scrambler 103a and then encoded using Reed-Solomon Encoder 103b. Frame Control Header (FCH) data 105 is then added to the encoded data. Data is protected by convolutional code in Convolutional Encoder 103c and interleaved within the whole packet at Interleaver 103d. The PSK symbols are differentially encoded per subcarrier in time (t-DPSK) at modulator 107 and Inverse Fast Fourier Transformed at IFFT 109. A Cyclic Prefix (CP) packet is added at 111 and then each OFDM symbol is windowed at 113 by a raised-cosine slope of 8 samples at its beginning and end.

The analog-front-end (AFE) 115 is the interface between the transmitter 100 and the AC transmission line 117 and is under control of a Digital Signal Processor (DSP) or Microcontroller (not shown in FIG. 1). The AFE 115 converts the outgoing digital signal to an analog signal, amplifies the signal and transmits the OFDM modulated signal along the AC transmission line 117. The AFE is typically also used to receive signals incoming from the AC transmission line 117, as will now be described.

Figure 2:
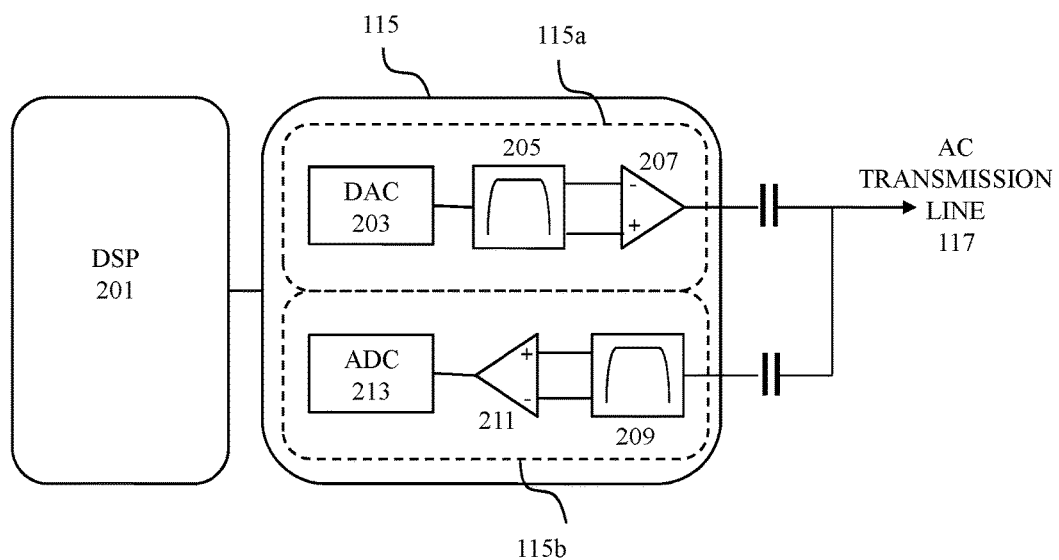
FIG. 2 is a schematic block diagram of an analog-front-end (AFE) in a transmitter such as that in FIG. 1.

FIG. 2 is a schematic block diagram of an AFE, such as AFE 115 of transmitter 100 of FIG. 1. AFE 115 is under control of DSP 201. The AFE includes a transmit Tx portion 115a and a receive Rx portion 115b. The Tx portion 115a is for transmitting the OFDM modulated signal along transmission line 117 and includes a Digital-to-Analog Converter (DAC) 203, a filter 205 and a power amplifier 207 for amplifying the signal before transmission. The Rx portion 115b is for receiving an OFDM modulated signal from transmission line 117 and includes a filter 209, a power gain amplifier 211 and an Analog-to-Digital Converter (ADC) 213. For the purposes of this embodiment of the present invention, we will focus on the Tx portion 115a. (Note that FIG. 2 is schematic in nature and does not include details of the AFE components. Nor does FIG. 2 include any additional components incorporated in the AFE. Note that, alternatively, some components such as the DAC and ADC may be included in the DSP.)

According to this embodiment of the method of the invention, determination of the input impedance of the AC transmission line 117 includes four steps: a) determining the current during transmission of the preamble portion of the modulated data packet, b) determining the voltage during transmission of the preamble portion of the modulated data packet, c) calculating the total impedance from the determined current and voltage and d) determining the input impedance of the AC transmission line from the total impedance. According to this embodiment of the invention, the four steps are implemented within the AFE, such as AFE 115 shown in FIGS. 1 and 2, in conjunction with a processor such as DSP 201 in FIG. 2, and this will now be described.

Determination of the Current and Voltage

In this embodiment, the current is determined in the AFE 115 on the downstream side of the power amplifier 207. A current sensor (not shown), such as a resistor, is included downstream of the power amplifier 207. As the preamble portion of the modulated data packet is transmitted, the voltage (referred to as V1) is sampled at the output of the power amplifier 207, and the voltage (referred to as V2) is sampled at the output of the current sensor. The voltage sampled at the output of the current sensor (V2) corresponds to the required voltage. The difference between the two sampled voltages (that is, the voltage drop across the resistive current sensor, V1-V2) may be used in conjunction with the impedance of the current sensor (ZREF) to determine the required current.

In this embodiment, the two voltages V1 and V2 are sampled using two available channels of the ADC 213. This is because the ADC is on the receive side 115b of the AFE so is available for use during the transmission of the data packet. However, it may be advantageous to use channels in each of two ADCs for sampling of the two voltages V1 and V2, so that the two voltages V1 and V2 can be sampled simultaneously. If only a single ADC is used, the two voltages V1 and V2 must be sampled sequentially. The inventors have found that simultaneous sampling of the two voltages V1 and V2 gives a better result than sequential sampling, since it avoids any time delay between sampling.

In order for the correct voltages V1 and V2 to be sampled, the sampling must be synchronised with the transmission of the preamble portion of the modulated data packet. This synchronisation will now be described.

In this embodiment, synchronisation is achieved using an input signal of the ADC. One option would be to use a Central Processing Unit (CPU) Timer Interrupt signal for synchronisation with the transmission. However, the inventors have found that the frequency of this signal is typically three times higher than the desired sampling frequency, so is not an ideal choice. A preferred option, therefore, is to use a Pulse Width Modulated (PWM) Interrupt signal. According to this option, to trigger the ADC to sample the voltage V1 or V2, either software may be used for the trigger during the interrupt routine of the PWM Interrupt signal, or a hardware clock can directly trigger the ADC.

Once the voltage has been sampled, there are two possibilities for transfer of the data from the ADC register to a buffer. According to the first possibility, the End of Conversion (EOC) will trigger an ADC Interrupt signal and an interrupt routine to transfer the data from the ADC register to a buffer will be initiated. The drawback of this possibility is that there is a limited clock number in which to sample the voltages, because of the mismatch between the sampling frequency of the signal and the frequency of the ADC. The second, preferred, possibility is to use Direct Memory Access (DMA). This allows transfer of data from the ADC register, without intervention of the CPU, thereby allowing the CPU to still perform other system functions. According to this possibility, the DMA receives a trigger from the ADC Interrupt signal at the EOC. Two DMA channels are then used to transfer the data (two sampled voltages V1 and V2) from the ADC register to a buffer.

Calculation of the Total Impedance

The voltages (V1 and V2) are now stored in memory. In this embodiment, in order to calculate the total impedance, the voltages should first be transformed to complex form. Then, the total impedance (Zt) can be derived from the complex voltages, V1 and V2, and the current sensor complex impedance ZREF. The two steps are preferably carried out in the DSP 201.

According to this embodiment, transforming the voltages into complex form is performed using a Fast Fourier Transform (FFT) or Inverse Fast Fourier Transform (IFFT). As already discussed, preferably this is performed in the DSP. The FFT or IFFT for the voltages may be performed in series. Preferably, however, the two FFTs/IFFTs are performed in parallel using a complex input sequence. Preferably, complex number operations are supported by 32-bit complex numbers, in which the upper half (16 bits) of the 32-bit number is the real part and the lower half (16 bits) is the imaginary part. (Note that it is possible that the PLC software uses the convention that the upper 16 bits of the 32-bit number is the imaginary part and the lower 16 bits is the real part, in which case the two halves will need to be flipped to avoid error.)

In this embodiment, the component of the FFT (or IFFT) matrix W(N, k) (cos and sin values) are previously computed and stored in a LookUp Table (LUT). The difference between the FFT and IFFT is only the "twiddle factor" "cos (θ)+j sin (θ)" for IFFT or "cos (θ)–j sin (θ)" for FFT. Consequently, we can generate the two twiddle factors separately, or save the two twiddle factors in the two LookUp Tables. However, since we can derive the FFT from the IFFT by swapping the real and imaginary parts of the input, and swapping again the real and imaginary parts of the output, we can save memory space by storing only one or the other. However, the saving in memory space is balanced by a reduction in processing speed (MIPS).

In order to perform the FFT or IFFT, the input sequence of bits may need to be rearranged. As will be appreciated by the person skilled in the art, this may be performed in a number of ways, such as interleaving, or reverse carry propagation.

Once the two voltages are in complex form, the complex total impedance (Zt) should be calculated according to:

$$Z_t = \frac{V_2 Z_{ref}}{V_2 - V_1}.$$

The division may be achieved by a number of methods (including conditional subtraction) which will be familiar to the person skilled in the art. The division may use fixed point notation or floating point notation and this will be discussed further below.

Determination of the Instantaneous Impedance

The total impedance Zt is the combination of the input impedance of the AC transmission line (ZL) and the AFE impedance (ZAFE) which may include the impedance of the output filter and coupler. If the scattering parameters of the AFE are represented by Sxx, and we define:

$$\Gamma = \frac{Z_t - 50}{Z_t + 50},$$

and:

$$\Gamma_L = \frac{\Gamma - S_{11}}{S_{22} * (\Gamma - S_{11}) + S_{12} * S_{21}},$$

we then have:

$$Z_L = 50 * \frac{1 + \Gamma_L}{1 - \Gamma_L} \quad (1)$$

In addition, the total impedance Zt is the result of the complex current/voltage division multiplied by ZREF. Thus:

$$Z_t = \frac{V_2 Z_{ref}}{V_2 - V_1} = \frac{(V_2(V_2 - V_1)^*)}{|V_2 - V_1|^2} Z_{ref} = \frac{Num}{Den} Z_{ref}. \quad (2)$$

Since $Z_{REF}$ is known and Num/Den has been derived by the complex division process described above, ZL, the input impedance of the AC transmission line can be determined.

As already mentioned, the division Num/Den may be performed using either Fixed point division with a dynamic scale or Floating point division, as will now be explained.

If Fixed point division is used for the division Num/Den, after the multiplication, both Num and Den comprise 32 bits. In order to compute the 16-bit division, we consider the dynamic scale as:

$$\frac{\frac{Num}{\alpha}}{\frac{Den}{\alpha}},$$

where a denotes the scale value, which can vary from channel to channel. The α value is given by $$\begin{cases} \alpha = 2^{16-offset_{numerator}}, & \text{if } offset_{numerator} \leq 15, \\ 1, & \text{if } offset_{numerator} \geq 16, \end{cases}$$

where the offset numerator represents the offset between the first bit 1 and the MSB of the numerator.

The offset computation is simpler if we consider the absolute value, so we need to save the sign of the output quotient, and restore the sign when the division operation is done. In DSP, to save the instructions when computing the offset, we need to verify if either the 16 bit high part or the 16 bit low part of the 32 bit absolute value are 0, consequently, we can save the number of shift operations. Note that there are some particular cases where we can obtain the quotient directly without the division operation. For example, if Num=0, then the quotient is 0 (assuming Den≠0).

For Floating point division, the numerator and the denominator are converted from 32-bit fixed-point to floating point. The quotient is then reconverted from floating point to 16-bit fixed-point.

Thus, according to this embodiment of the invention, a picture of the input impedance of the AC transmission line (ZL) may be obtained as it varies with time and frequency of the transmitted signal. Preferably, the method is performed for every packet transmitted along the AC transmission line, thereby producing a measure of the line's input impedance which is considerably better than in the prior art. No separate injected signal is required, and no separate input connection is required.

One further proposal may improve the method even further. In PLC G3, the preamble portion generally includes 9 and ½ OFDM symbols. It is possible for all the preamble symbols to be used for the current and voltage determinations. However, it is advantageous that only some, but not all, of the symbols are used. This can allow the input impedance to be determined in the processor, before the next packet needs to be transmitted. For example, only one or only four of the preamble symbols may be used.

The invention claimed is:

1. A method for determining input impedance (ZL) of an alternating current (AC) transmission line used for Power Line Communications (PLC), using a transmitted data packet having a preamble portion, the method comprising, the steps of:

at an analog-front-end (AFE) of the AC transmission line, determining current through the AFE and the AC transmission line during transmission of the preamble portion of the data packet;

at the AFE of the AC transmission line, determining voltage during transmission of the preamble portion of the data packet;

from the determined current and voltage, calculating total impedance (Zt), the total impedance (Zt) including the input impedance (ZL) of the AC transmission line and AFE impedance (ZAFE); and determining the input impedance (ZL) of the AC transmission line from the total impedance (Zt).

2. A method according to claim 1, wherein the step of determining the current during transmission of the preamble portion of the data packet comprises determining the current using a current sensor in the AFE.

3. A method according to claim 2, wherein the AFE includes a power amplifier for amplifying the data packet to be transmitted, and the current sensor is in series with an output of the power amplifier.

4. A method according to claim 1, wherein the AFE includes a power amplifier and the step of determining the voltage comprises determining the voltage at an output of the power amplifier.

5. A method according to claim 1, wherein the steps of determining the current during transmission of the preamble portion of the data packet and determining the voltage during transmission of the preamble portion of the data packet comprise sampling two voltages during transmission of the preamble portion of the data packet, the two voltages being sampled using two respective channels of an Analog-to-Digital Convertor (ADC) in the AFE.

6. A method according to claim 1, wherein the steps of determining the current and determining the voltage are synchronised with transmission of the preamble portion of the data packet using one or more input signals of an Analog-to-Digital Converter (ADC) in the AFE.

7. A method according to claim 1, wherein the step of calculating the total impedance (Zt) from the determined current and voltage comprises:

a) transforming the determined voltages to complex form; and b) calculating the total impedance (Zt) using the complex voltages (V1, V2) and known current sensor impedance (ZREF).

8. A method according to claim 1, wherein the step of determining the input impedance (ZL) of the AC transmission line from the total impedance (Zt) comprises de-embedding the AFE impedance (ZAFE) from the total impedance (Zt).

9. A method according to claim 1, wherein the current and voltage are determined during transmission of a part of the preamble portion, such that the step of calculating and the step of determining are performed before a next data packet is transmitted along the AC transmission line.

10. Apparatus for determining input impedance (ZL) of an alternating current (AC) transmission line used for Power Line Communications (PLC), using a transmitted data packet having a preamble portion, the apparatus comprising:

a current sensor in an analog-front-end (AFE) of the AC transmission line for determining current through the AFE and the AC transmission line during transmission of the preamble portion of the data packet;

a voltage sensor in the AFE of the AC transmission line for determining voltage during transmission of the preamble portion of the data packet;

means for calculating, from the determined current and voltage, total impedance (Zt), the total impedance (Zt) including the input impedance (ZL) of the AC transmission line and AFE impedance (ZAFE); and means for determining the input impedance (ZL) of the AC transmission line from the total impedance (Zt).

11. Apparatus according to claim 10, wherein the AFE further includes a power amplifier for amplifying the data packet to be transmitted and the current sensor is in series with an output of the power amplifier.

12. Apparatus according to claim 10, wherein the determined current during transmission of the preamble portion of the data packet and the determined voltage during transmission of the preamble portion of the data packet are obtained by sampling two voltages during transmission of the preamble portion of the data packet, the two voltages being sampled using two respective channels of an Analog-to-Digital Convertor (ADC) in the AFE.

13. Apparatus according to claim 10, wherein the means for calculating, from the determined current and voltage, the total impedance (Zt) is arranged to a) transform determined voltages to complex form; and b) calculate the total impedance (Zt) using the complex voltages (V1, V2) and known current sensor impedance (ZREF).

14. Apparatus according to claim 10, wherein the current and voltage are determined during transmission of a part of the preamble portion, such that the means for calculating and the means for determining perform the calculating and determining before a next data packet is transmitted along the AC transmission line.

15. A method for determining input impedance (ZL) of an alternating current (AC) transmission line used for narrow band Power Line Communications (PLC), using a transmitted data packet having a preamble portion, the method comprising the steps of:

a) determining voltage (V1) at an output of a power amplifier in an analog-front-end (AFE) of the AC transmission line, during transmission of the preamble portion of the data packet;

b) determining voltage (V2) at an output of a passive component at the output of the power amplifier in the AFE of the AC transmission line, during transmission of the preamble portion of the data packet;

c) using a difference between the voltages (V1, V2) determined at a) and b), and an impedance (ZREF) of the passive component, to determine current during transmission of the preamble portion of the data packet;

d) storing the voltage (V1) determined at a) and the current determined at c) in memory;

e) calculating total impedance (Zt) from the stored voltage (V1) determined at a) and the stored current determined at c), the total impedance (Zt) including the input impedance (ZL) of the AC transmission line and AFE impedance (ZAFE); and f) determining the input impedance (ZL) of the AC transmission line from the total impedance (Zt).

* * * * *